United States Patent
Pusheck

(10) Patent No.: US 10,668,882 B2
(45) Date of Patent: Jun. 2, 2020

(54) MECHANICAL TRANSFER FUNCTION CANCELLATION

(71) Applicant: Veoneer US Inc., Southfield, MI (US)

(72) Inventor: Jacob Pusheck, West Bloomfield, MI (US)

(73) Assignee: VEONEER US INC., Southfield, MI (US)

( * ) Notice: Subject to any disclaimer, the term of this patent is extended or adjusted under 35 U.S.C. 154(b) by 223 days.

(21) Appl. No.: 15/941,200

(22) Filed: Mar. 30, 2018

(65) Prior Publication Data

US 2019/0299891 A1    Oct. 3, 2019

(51) Int. Cl.
| | |
|---|---|
| *G05B 9/02* | (2006.01) |
| *G01D 3/028* | (2006.01) |
| *G01D 3/036* | (2006.01) |
| *G01P 15/00* | (2006.01) |
| *B60R 21/013* | (2006.01) |
| *B60R 21/0132* | (2006.01) |

(52) U.S. Cl.
CPC .......... *B60R 21/013* (2013.01); *G01D 3/028* (2013.01); *G01D 3/036* (2013.01); *G05B 9/02* (2013.01); *B60R 21/01336* (2014.12); *G01P 15/00* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,815,393 | A | * 9/1998 | Chae | B60R 21/013 180/282 |
| 6,036,642 | A | 3/2000 | Diab et al. | 600/364 |
| 2001/0052727 | A1 | 12/2001 | Betts | 303/191 |
| 2005/0283330 | A1 | 12/2005 | Laraia et al. | 702/104 |
| 2007/0228705 | A1 * | 10/2007 | Rao | B60R 21/0134 280/735 |
| 2011/0203377 | A1 * | 8/2011 | Seto | G01P 3/52 73/649 |

FOREIGN PATENT DOCUMENTS

CN              102095430 B        6/2012        ............. G01D 3/02

* cited by examiner

*Primary Examiner* — Thomas G Black
*Assistant Examiner* — Ana D Thomas
(74) *Attorney, Agent, or Firm* — Christopher P. Maiorana, PC

(57) ABSTRACT

An apparatus includes one or more sensors and a control unit. The one or more sensors may be configured to generate signals in response to movement of a vehicle. The control unit generally comprises (i) an interface configured to receive the signals from the sensors and (ii) a filter configured to reduce an effect that a mechanical transfer function of a housing of at least one of the sensors has on at least one of the signals. The filter may be configured to utilize a variable frequency band digital representation of the mechanical transfer function to negate the effect of the mechanical transfer function of the housing on the at least one of the signals.

20 Claims, 12 Drawing Sheets

300

| X INPUT | | |
|---|---|---|
| MAGNITUDE RANGE | FREQUENCY BAND | MULTIPLICATION FACTOR |
| LOW | 0-10 | 0.769230769 |
| LOW | 10-50 | 0.39300452 |
| LOW | 50-200 | 0.191039358 |
| LOW | 200-500 | 0.410756058 |
| LOW | 500-700 | 0.655632374 |
| LOW | 700-1000 | 0.743306525 |
| LOW | 1000-1500 | 0.890993741 |
| LOW | 1500-2000 | 0.889494536 |
| LOW | 2000-4000 | 0.702531657 |
| LOW | 4000-7000 | 0.956522741 |
| MEDIUM | 0-10 | 0.864796308 |
| MEDIUM | 10-50 | 0.441829515 |
| MEDIUM | 50-200 | 0.214773171 |
| MEDIUM | 200-500 | 0.461786419 |
| MEDIUM | 500-700 | 0.737084993 |
| MEDIUM | 700-1000 | 0.83565136 |
| MEDIUM | 1000-1500 | 1.001686526 |
| MEDIUM | 1500-2000 | 1.000001067 |
| MEDIUM | 2000-4000 | 0.789810818 |
| MEDIUM | 4000-7000 | 1.075356535 |
| HIGH | 0-10 | 1.074373069 |
| HIGH | 10-50 | 0.548903513 |
| HIGH | 50-200 | 0.266821804 |
| HIGH | 200-500 | 0.573696821 |
| HIGH | 500-700 | 0.915711895 |
| HIGH | 700-1000 | 1.038165065 |
| HIGH | 1000-1500 | 1.244437583 |
| HIGH | 1500-2000 | 1.242343666 |
| HIGH | 2000-4000 | 0.98121542 |
| HIGH | 4000-7000 | 1.335960955 |

MECHANICAL TRANSFER FUNCTION CANCELLATION

FIELD OF THE INVENTION

The invention relates to vehicle sensors and control systems generally and, more particularly, to a method and/or apparatus for implementing mechanical transfer function cancellation.

BACKGROUND

A large amount of time is spent in developing sensor systems that minimize an effect that a mechanical housing has on the mechanical signal applied to the mechanical housing. A long development time increases time to market, as well as capital investment in a project. In addition, the increased time to market and capital costs can potentially lead to designs and material choices with non-ideal solutions. The marketplace is ever more critical of the accuracy that sensors provide. To achieve more accurate sensor systems a more analytical approach needs to be taken.

It would be desirable to implement mechanical transfer function cancellation.

SUMMARY

The invention concerns an apparatus including one or more sensors and a control unit. The one or more sensors may be configured to generate signals in response to movement of a vehicle. The control unit generally comprises (i) an interface configured to receive the signals from the sensors and (ii) a filter configured to reduce an effect that a mechanical transfer function of a housing of at least one of the sensors has on at least one of the signals. The filter may be configured to utilize a variable frequency band digital representation of the mechanical transfer function to negate the effect of the mechanical transfer function of the housing on the at least one of the signals.

BRIEF DESCRIPTION OF THE FIGURES

Embodiments of the invention will be apparent from the following detailed description and the appended claims and drawings in which:

FIG. 5 is a diagram illustrating an example lookup table in accordance with an example embodiment of the invention;

DETAILED DESCRIPTION OF THE EMBODIMENTS

Embodiments of the present invention include providing mechanical transfer function cancellation that may (i) negate most of the effect that mechanical transfer function has on a signal, (ii) utilize a series of lookup tables to divide out an effect that the mechanics have on the signal, (iii) make a lookup table based on real world testing or CAE data, (iv) make a lookup table on a per application basis, (v) make a lookup table applicable only on the module level, (vi) make a lookup table that takes into account multi-axial inputs, (vii) provide a lookup table that is effective for single, dual, or tri-axial sensor application, (viii) optimize a lookup table to "cut out" resonances by using a variable frequency band, (ix) provide a lookup table that reduces an effect that a mechanical transfer function has on overall performance of a system, (x) build a lookup table based on a filtered or unfiltered signal, (xi) provide a more accurate representation of mechanical signal to be used by algorithm, (xii) cut out resonances using variable frequency bands, (xiii) provide pre and post-filtered lookup tables, and/or (xiv) be implemented as part of an electronic control unit of a vehicle.

Figure 1:
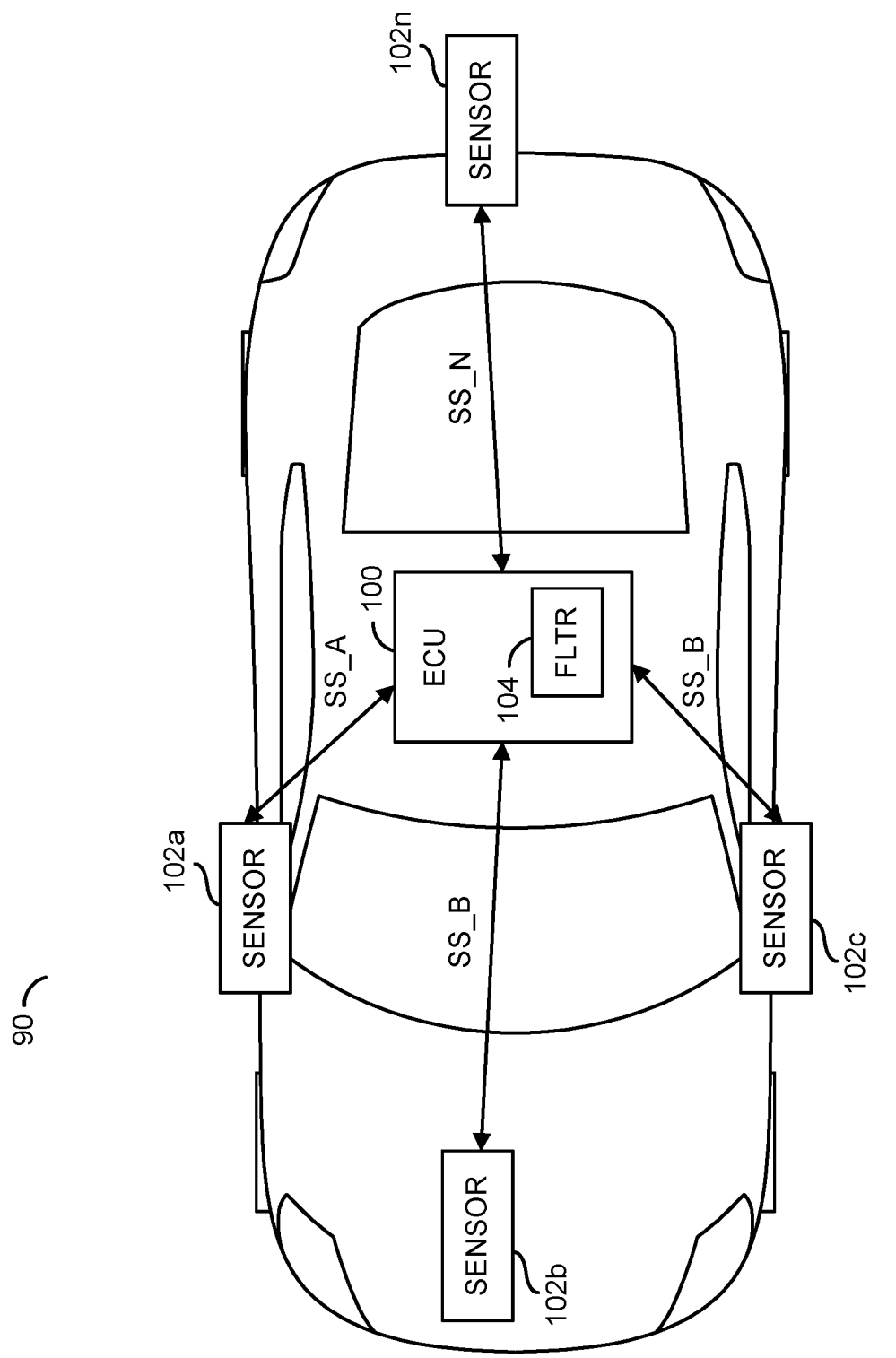
FIG. 1 is a diagram illustrating a context of the invention.

Referring to FIG. 1, a block diagram is shown illustrating a context of the invention. In various embodiments, a vehicle 90 may include an electronic control unit (ECU) 100 and a number of sensors 102*a*-102*n* in communication with the ECU 100. In an example, the sensors 102*a*-102*n* may be part of a safety system of the vehicle 90. In an example, the sensors 102*a*-102*n* may include, but are not limited to a micro electro-mechanical system/sensor (MEMS), an accelerometer, a pressure sensor, and/or a temperature sensor. The sensors 102*a*-102*n* may be configured to communicate signals related to motion and/or impacts of the vehicle to the ECU 100. In an example, the sensors 102*a*-102*n* may comprise satellite (remote) sensor units mounted in the door beam, the pillar between doors, the rocker panels, and/or in various locations at the front, sides, and back of the vehicle 90. In an example, the sensors 102*a*-102*n* may be configured to provide acceleration data to enable early and appropriate deployment of safety related systems (e.g., airbags, seatbelt pretensioners, etc.).

In various embodiments, the sensors 102*a*-102*n* may be directly wired to the ECU 100. In some embodiments, the sensors 102*a*-102*n* may be configured to communicate with the ECU 100 using a wireless protocol. In some embodiments, the wireless protocols may include, but are not limited to, one or more of a Wi-Fi communication protocol, a cellular communication protocol, a BlueTooth communication protocol, a ZigBee communication protocol, a Z-Wave communication protocol, etc. For example, the wireless communication devices 112*a*-112*n* may implement one or more of Bluetooth®, ZigBee®, Institute of Electrical and Electronics Engineering (IEEE) 802.11, IEEE 802.11ac, IEEE 802.15, IEEE 802.15.1, IEEE 802.15.2, IEEE 802.15.3, IEEE 802.15.4, IEEE 802.15.5, and/or IEEE 802.20, GSM, CDMA, GPRS, UMTS, CDMA2000, 3GPP LTE, 4G/HSPA/WiMAX, 5G, SMS, etc.

In the example shown, only one electronic control unit (e.g., ECU 100) is shown (e.g., as a representative example, for clarity). In some embodiments, multiple types of electronic control units may be implemented. For example, the types of electronic control units represented by the ECU 100 may include, but are not limited to, an Engine Control Module (ECM), a Powertrain Control Module (PCM), a Brake Control Module (BCM), a General Electric Module (GEM), a Transmission Control Module (TCM), a Central Control Module (CCM), a Central Timing Module (CTM), a Body Control Module (BCM), a Suspension Control Module (SCM), a Restraint System Control Module (RSCM), etc. The number and/or types of electronic control units (or modules) 100 may be varied according to the design criteria of a particular implementation.

In some embodiments, the electronic control unit 100 may determine one or more corrective measures in response to a data model generated in response to sensor data received from the sensors 102a-102n. In an example, the corrective measures implemented by an Engine control module (ECM) electronic control unit 100 may control fuel injection, ignition timing, engine timing and/or interrupt operation of an air conditioning system in response to sensor data from the sensors 102a-102n (e.g., engine coolant temperature, air flow, pressure, etc.). In another example where the ECU 100 is part of a Restraint Control System (RCS) of the vehicle 90, corrective measures implemented by the electronic control unit 100 may control air bag deployment and/or seat belt pretensioning in response to inertial, impact, and/or proximity sensor data monitored by the sensors 102a-102n. In yet another example, corrective measures implemented by the electronic control unit 100 may comprise activating a warning light (e.g., check engine, coolant temperature warning, oil pressure warning, ABS indicator, gas cap warning, traction control indicator, air bag fault, etc.). The number, type, and/or thresholds for sensor data used to initiate the corrective measures may be varied according to the design criteria of a particular implementation.

In an example, the electronic control unit (ECU) 100 may be implemented as the brain of a Restraint Control System (RCS) of the vehicle 90. In an example, the ECU 100 may decide not only if, but also exactly when, the seatbelt pretensioners should be triggered and each airbag system should be deployed. The ECU 100 generally contains impact sensors and a processor, as well as back-up power in the event the connection to the main battery of the vehicle 90 is cut off in an accident. In an example, the ECU 100 may be located in the middle of the vehicle 90 where the ECU 100 may be well protected during an accident. In some embodiments, the ECU 100 may be configured to also record event data for analysis after an event.

Passive safety electronics generally measure deceleration, since vehicle speed is not an adequate indicator of whether an airbag should be deployed or not. Airbags and seatbelt pretensioners in frontal and near-frontal collisions are typically designed to deploy when the force of an event is comparable to hitting a solid barrier at approximately 8 to 12 mph. This is approximately equivalent to striking a parked car of similar size at about 27 mph, assuming 100% of the fronts of both vehicles are engaged in the impact.

Unlike most impact tests into barriers, real-world impacts typically occur at angles, and the impact forces usually are not evenly distributed across the front of the vehicle. In addition, the parked car absorbs some of the energy of the impact and is pushed by the striking vehicle. Consequently, the relative speed between a striking and struck vehicle needed to deploy the airbag in a real-world situation may be much higher than an equivalent barrier impact.

In various embodiments, the ECU 100 may include a filter 104. The filter 104 may be configured to store a model of a mechanical transfer function (MTF) of respective housings of the sensors 102a-102n. In an example, the filter 104 may be implemented as a lookup table (LUT) memory. In various embodiments, the filter 104 may store a cancellation table that may be used by the ECU 100 to negate an effect that the mechanical transfer function of the housings of the sensors 102a-102n has on the signals generated by the sensors 102a-102n. In various embodiments, the LUT in the filter 104 may embody a cancellation table comprising a plurality of multiplication factors associated with a plurality of frequency bands and a plurality of magnitude ranges. In some embodiments, the LUT in the filter 104 may be implemented as a series of lookup tables that may be utilized by the ECU 100 to divide out the effect that the mechanics of the vehicle 90 have on the signals received from the sensors 102a-102n.

In various embodiments, the values embodied in the lookup table in the filter 104 may be based on real world testing or CAE data. The lookup table in the filter 104 may be made per application or only on the module level. The lookup table in the filter 104 may be made to take into account multi-axial inputs. The lookup table in the filter 104 may be effective for single, dual, or tri-axial sensor applications. The lookup table in the filter 104 may be optimized to "cut out" resonances by using a variable frequency band. In general, the lookup table in the filter 104 may be configured to reduce the effect that the mechanical transfer function has on a systems overall performance. In various embodiments, the lookup table in the filter 104 may be built based on a filtered or unfiltered sensor signal. In various embodiments, the lookup table in the filter 104 generally provides a more accurate representation of a mechanical signal to be used by the ECU 100 in making decisions regarding safety system deployment.

Figure 2:
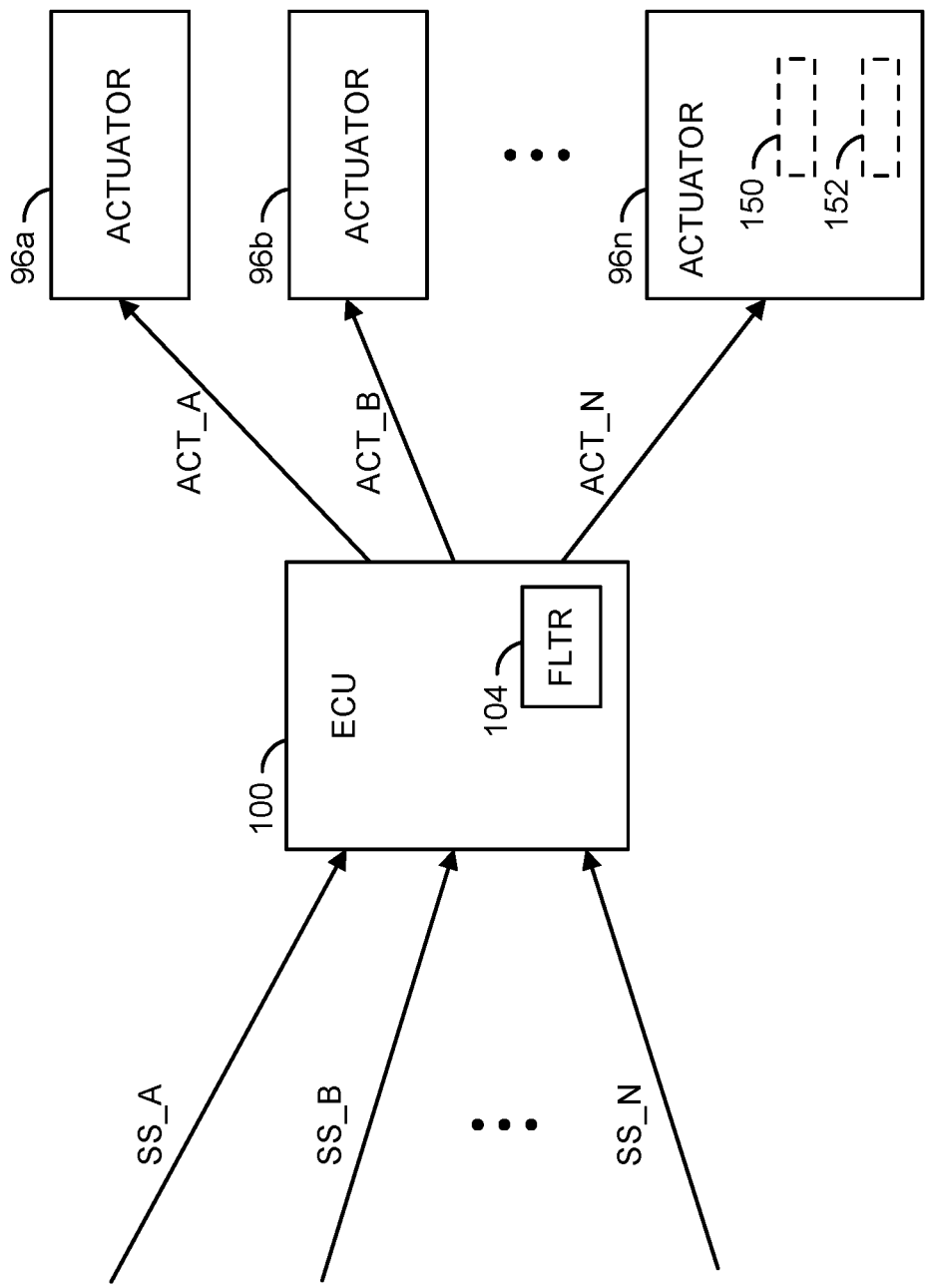
FIG. 2 is a block diagram illustrating a control unit communicating with actuators.

Referring to FIG. 2, a block diagram illustrating the control unit 100 communicating with actuators is shown. The ECU 100 is shown receiving the sensor signals SS_A-SS_N. The ECU 100 may generate a number of control signals (e.g., ACT_A-ACT_N). The ECU 100 is shown connected to a number of blocks (or circuits) 96a-96n. The circuits 96a-96n may implement actuators. The ECU 100 may receive the signals SS_A-SS_N, interpret the sensor data and make one or more decisions. The signals ACT_A-ACT_N may be output signals configured to activate the decisions (e.g., corrective measures) determined by the ECU 100.

The actuators 96a-96n may be components of the vehicle 90 configured to cause an action, move and/or control an aspect of the vehicle 90. The actuators 96a-96n may be configured to perform the corrective measures. In an example, the actuators 96a-96n may be one or more of a braking system, a steering system, a lighting system, windshield wipers, a heating/cooling system, an air bag system, a seatbelt pretensioner system, etc. In some embodiments, the actuators 96a-96n may be configured to respond to information received from the ECU 100. The ECU 100 may determine desired (e.g., optimum) settings for the output actuators 96a-96n (injection, idle speed, ignition timing, deployment timing and/or sequence, etc.). For example, if the ECU 100 implements a steering system, the ECU 100 may receive one of the signals SS_A-SS_N indicating that a collision with a nearby vehicle is likely and the ECU 100 may respond by generating one or more of the signals ACT_A-ACT_N configured to cause the actuators 96a-96n to change a direction of the vehicle 90 (e.g., a corrective measure).

In another example, if the ECU 100 implements an air bag control system, the ECU 100 may receive one of the signals SS_A-SS_N indicating that a collision has occurred (or is likely to occur) and the ECU 100 may respond by generating one or more of the signals ACT_A-ACT_N configured to cause the actuators 96a-96n to deploy the air bags (e.g., a corrective measure). In advanced air bag systems, the sensors 102a-102n may detect the weight of the occupants, where occupants are seated, and whether the occupants are using a seatbelt. All of the factors detected by the sensors 102a-102n may help the ECU 100 to decide whether and/or how to deploy the actuators 96a-96n (e.g., frontal air bags). The types of actuators 96a-96n implemented may be varied according to the design criteria of a particular implementation.

In some embodiments, the sensors 102a-102n and/or the actuators 96a-96n may be implemented to enable autonomous driving of the vehicle 90. For example, the sensors 102a-102n may receive and/or capture input to provide information about the nearby environment. The information captured by the sensors 102a-102n may be used by components of the vehicle 90 and/or the ECU 100 to perform calculations and/or make decisions. The calculations and/or decisions may determine what actions the vehicle 90 should take. The actions that the vehicle 90 should take may be converted into signals and/or a format readable by the actuators 96a-96n. The actuators 96a-96n may cause the vehicle 90 to move and/or respond to the environment. Other components may be configured to use the data provided by the system 100 to make appropriate decisions for autonomous driving.

In the example shown, the ECU 100 may be connected to the actuators 96a-96n using a wired connection. For example, a wired connection to the actuators 96a-96n may enable a reliable and/or fast data transmission to deploy corrective measures quickly. In the example shown, the communication to the actuator 96a-96n (e.g., the transmission of the signal ACT_N) may be a wireless communication. The actuator 96n is shown comprising a block (or circuit) 150 and/or a block (or circuit) 152. The circuit 150 may implement an antenna. The circuit 152 may implement a wireless communication device. The actuators 96a-96n may comprise other components (not shown). The number, type and/or arrangement of the components of the actuators 96a-96n may be varied according to the design criteria of a particular implementation.

In some embodiments, one or more of the connections between the ECU 100 and the actuators 96a-96n may be the wireless communication. For example, the antenna 150 may have a similar implementation as the antennas 110a-110n implemented by the sensors 102a-102n and/or the antenna 120 implemented by the ECU 100. In another example, the communication device 152 may have a similar implementation as the communication devices 112a-112n implemented by the sensors 102a-102n and/or the communication device 122 implemented by the ECU 100. Similarly, implementing the wireless communication between the ECU 100 and one or more actuators 96a-96n may reduce a complexity of wire routing, reduce a weight of the vehicle 90, enable asynchronous communication of the signals ACT_A-ACT_N and/or enable an increased data rate transfer compared to the wired connections.

The corrective measures may be performed by the actuators 96a-96n. The corrective measures may implement the decisions determined by the ECU 100. The corrective measures may be actions and/or responses. The corrective measures may be real-world (e.g., physical) actions (e.g., movement, audio generation, electrical signal generation, etc.). The corrective measures may comprise the deployment of restraint systems.

Figure 3:
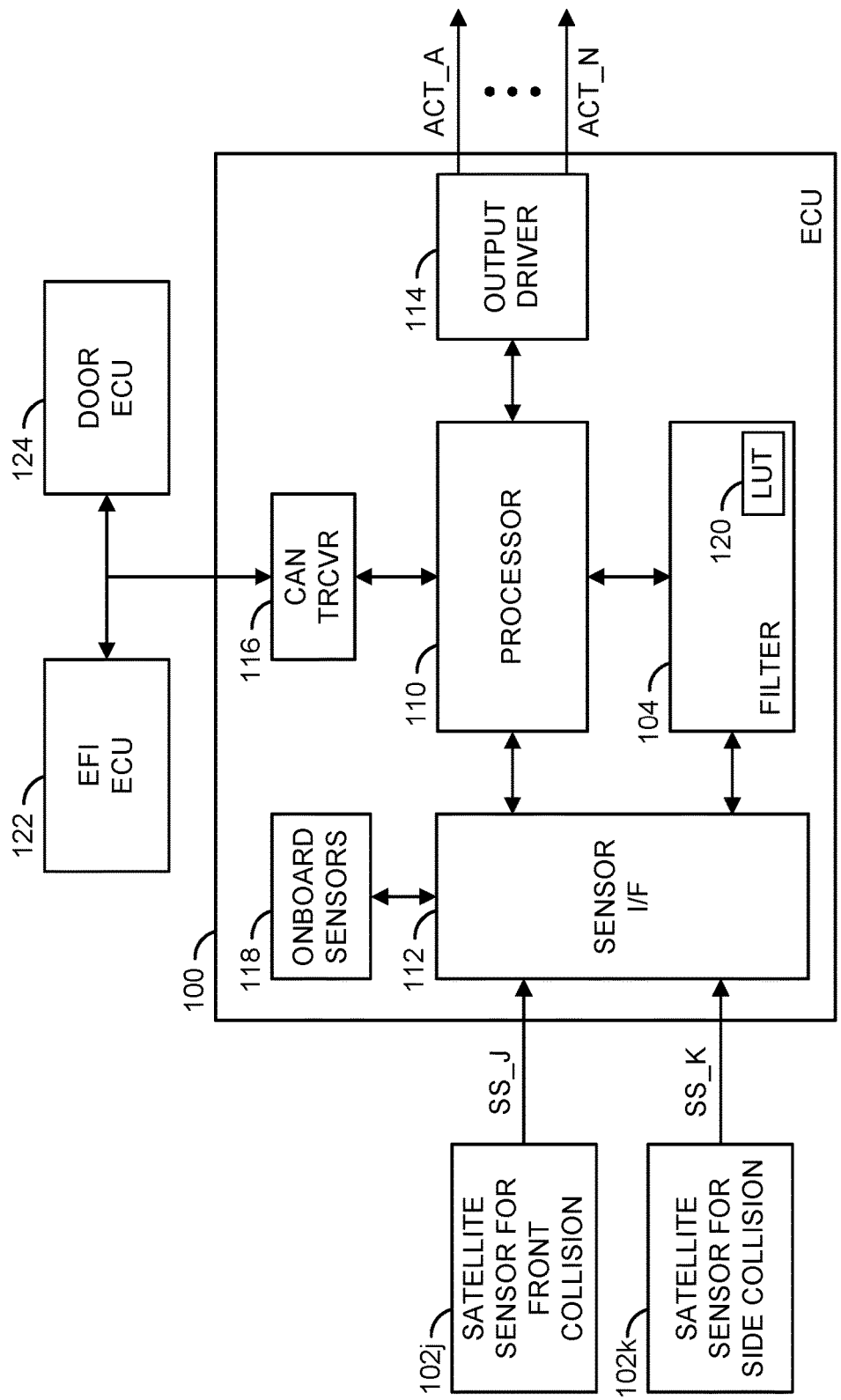
FIG. 3 is a block diagram illustrating a control unit in accordance with an example embodiment of the invention.

Referring to FIG. 3, a block diagram is shown illustrating a control unit in accordance with an example embodiment of the invention. In an example, the ECU 100 may further comprise a processor 110, a sensor interface 112, an output driver 114, a controller area network (CAN) bus transceiver 116, and one or more onboard sensors 118. The onboard sensors 118 may comprise sensing elements similar to the satellite (remote) sensors 102a-102a, but configured for application within the ECU 100. In an example, the onboard sensors 118 may include, but are not limited to a micro electro-mechanical system/sensor (MEMS), an accelerometer, a pressure sensor, a temperature sensor, a single-axis sensor, a dual-axis sensor, a tri-axial sensor, and/or a gyroscopic sensor. The onboard sensors may include main sensors and backup (or safety) sensors.

The processor 110 may be configured to communicate with the filter 104, the sensor interface 112, the output driver 114, and the CAN transceiver 116. In various embodiments, the processor 110 may include internal memory (e.g., DRAM, ROM, FLASH, etc.). In some embodiments, the ECU 100 may include memory (e.g., DRAM, ROM, FLASH, etc.) that is external to the processor 110. The sensor interface 112 is generally configured to provide an appropriate input interface for various external sensor signals received by the ECU 100 and for various sensor signals generated by the onboard sensors. In an example, the sensor interface 112 may receive an external sensor signal or signals SS_J from a satellite sensor for front collision detection and an external sensor signal or signals SS_K from a satellite sensor or sensors for side collision detection. The output driver 114 is generally configured to generate the output signals ACT_A-ACT_N.

In an example, the sensor interface 112 may be configured to communicate with the filter 104 and processor 110. The filter 104 is generally configured to filter sensor signals received from the sensor interface 112 prior to presentation to the processor 110. In an example, the filter 104 may be configured, inter alia, to negate an effect that the mechanical transfer function of the housings of the sensors 102a-102n has on the signals SS_A-SS_N received from the sensors 102a-102n. The filter 104 may be configured to perform similar filtering of the signals received from the onboard sensors 118. In an example, the filter 104 generally implements a variable frequency band cancellation technique in accordance with an example embodiment of the invention. In an example, a lookup table 120 implementing variable spaced blocks may provide greater improvement in the sensor signals than would have been realized with no filtering and/or filtering with constant frequency bands. The filter 104 generally communicates the filter sensor signals to the processor 110.

The ECU 100 may be connected with other control units of the vehicle 90 via a controller area network (CAN). In an example, the CAN transceiver 116 may connect the ECU 100 to one or more CAN buses of the vehicle 90. In an example, the ECU 100 may be connected with an electronic fuel injection (EFI) ECU 122 and a door ECU 124.

Figure 4:
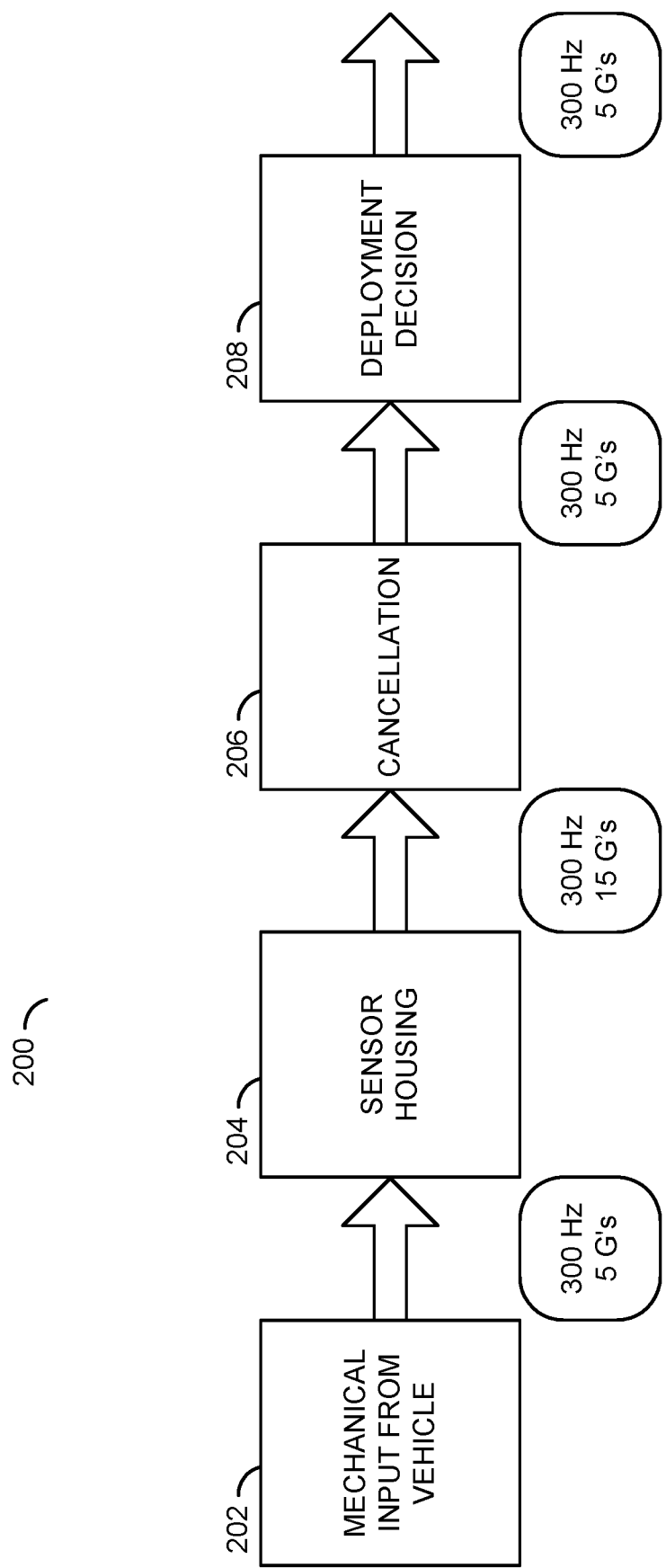
FIG. 4 is a diagram illustrating an overview of a system in accordance with an example embodiment of the invention.

Referring to FIG. 4, a diagram is shown illustrating an a simplified overview of a signal chain 200 in accordance with an example embodiment of the invention. In various embodiments, the signal chain 200 comprises a step (or stage) 202, a step (or stage) 204, a step (or stage) 206, and a step (or stage) 208. In the step 202, mechanical input is received from the vehicle. In an example, the data conveyed by the mechanical input has a frequency content of 300 Hz and a magnitude of 5 G's. In the step 204, the mechanical transfer function of the sensor housing modifies the signal from the vehicle. In an example, the frequency is content is unchanged, but the magnitude is increased by 3 times (e.g., 5 G's→15 G's). In the step 206, a cancellation process in accordance with an embodiment of the invention is performed to negate (filter) the effect of the sensor housing on the mechanical signal from the vehicle. In an example, the frequency is content is again unchanged, but the magnitude is restored to the original level (e.g., 5 G's). In the step 208, the filtered signal is passed to subsequent processing stages where deployment decisions are made. Because of the cancellation performed in the step 206, the deployment decision is made on data having frequency and magnitude content similar to the original mechanical input from the vehicle.

Referring to FIG. 5, a diagram is shown illustrating an example lookup table in accordance with an example embodiment of the invention. In an example, the LUT 104 may comprise a two-dimensional lookup table. In an example, the LUT 104 may be configured to provide multiplication factors corresponding with a magnitude range and a frequency band of the mechanical input signal. In an example, at varying accelerations (e.g., G levels) the multiplication factor for MTF cancellation is generally higher or lower for different frequency bands (ranges). In an example, magnitude and frequency content of the mechanical input may be determined and used as indices into the lookup table 300 to obtain a corresponding multiplication factor. In various embodiments, the frequency band parameter is configured as variable spaced intervals (or blocks) of frequencies. Implementing the lookup table 300 with variable spaced blocks may provide greater improvement in the filtered signal than would have been realized with no filtering and with constant (uniform) frequency bands.

Figure 6:
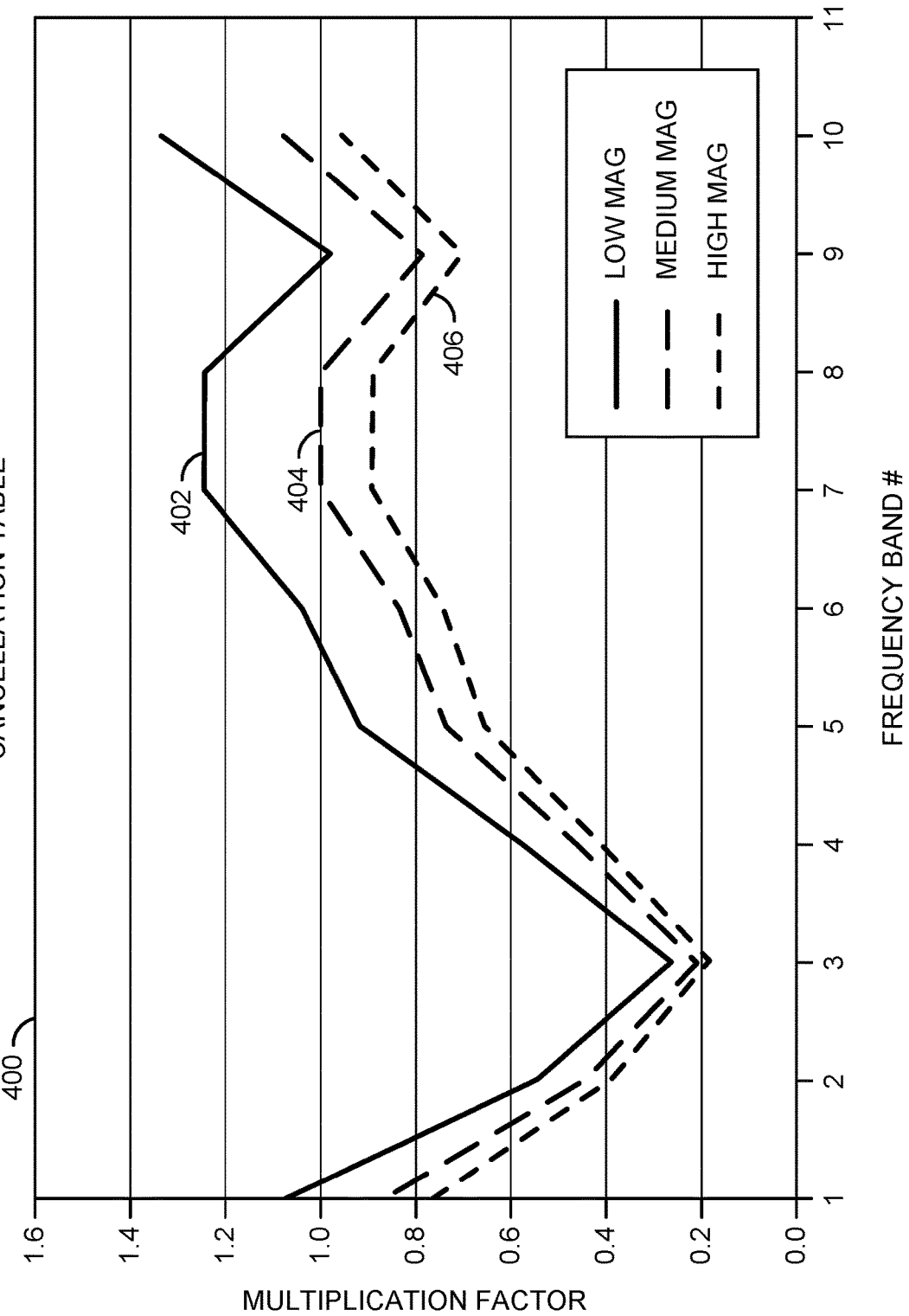
FIG. 6 is a diagram illustrating a cancellation table relative to a frequency distribution.

Referring to FIG. 6, a diagram is shown illustrating a graphic representation 400 of the cancellation table relative to a frequency bands for different magnitude levels. In an example, the cancellation table may be implemented with three magnitude ranges. Each magnitude range may have a different multiplication factor for the frequency bands. A curve 402 illustrates a low magnitude range portion of the cancellation table. A curve 404 illustrates a medium magnitude range portion of the cancellation table. A curve 406 illustrates a high magnitude range portion of the cancellation table.

Figure 7:
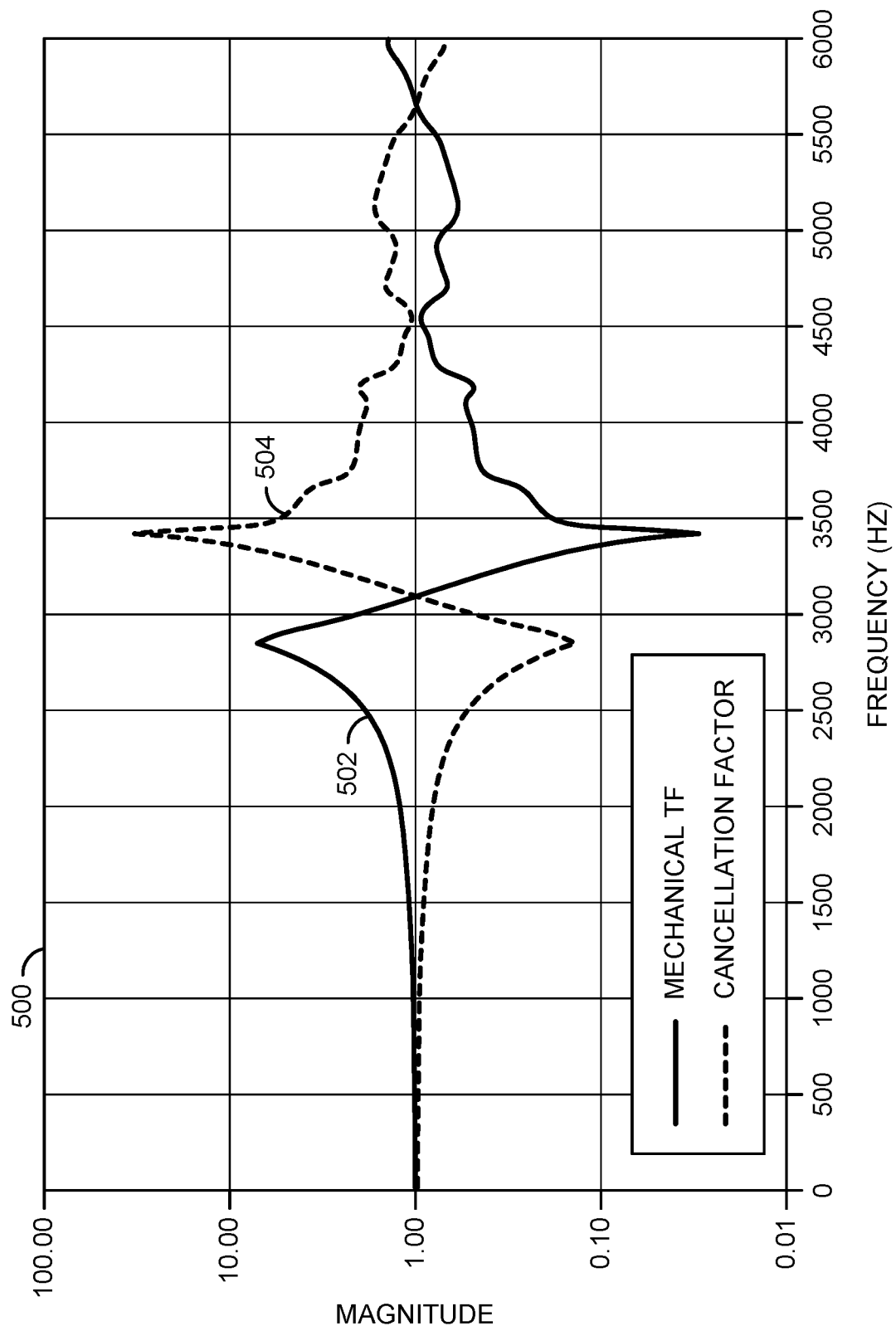
FIG. 7 is a diagram illustrating an example of continuous cancellation factor being applied to negate a mechanical transfer function.

Referring to FIG. 7, a diagram of a graph 500 is shown illustrating an example of a continuous cancellation factor being applied to negate a mechanical transfer function. A curve 502 illustrates an example mechanical transfer function of a housing. A curve 504 illustrates an example filter transfer function of the filter 104. In an ideal case, the cancellation factors of the lookup table 104 would be an exact inverse of the mechanical transfer function of the sensor housing. By providing continuous cancellation of either attenuation or amplification that exactly complements the mechanical transfer function of a sensor housing, the lookup table 104 may cancel out effects of the sensor housing on the mechanical signal from the vehicle being monitored by the sensor.

Figure 8:
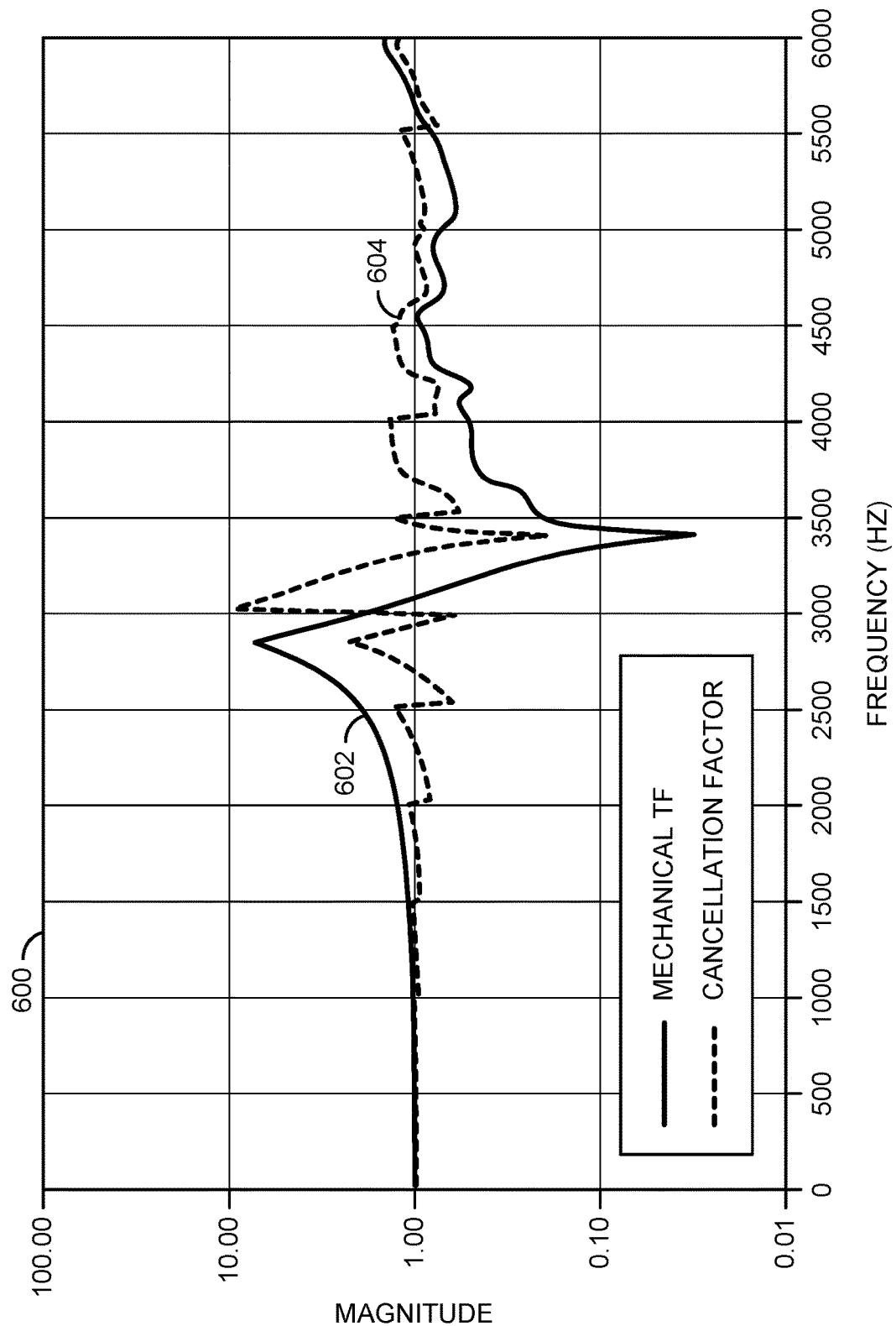
FIG. 8 is a diagram illustrating an example of a fixed frequency cancellation in accordance with an example embodiment of the invention.

Referring to FIG. 8, a diagram of a graph 600 is shown illustrating an example of a cancellation table implementing equally spaced cancellation values. A curve 602 illustrates an example mechanical transfer function of an example housing. In an example, equally spaced cancellation values (e.g., frequency bands of 500 Hz) could make the mechanical signal worse than the signal would have been originally. Or, provide only slightly better results. A curve 604 illustrates an example filtered signal resulting from equally spaced cancellation values.

Figure 9:
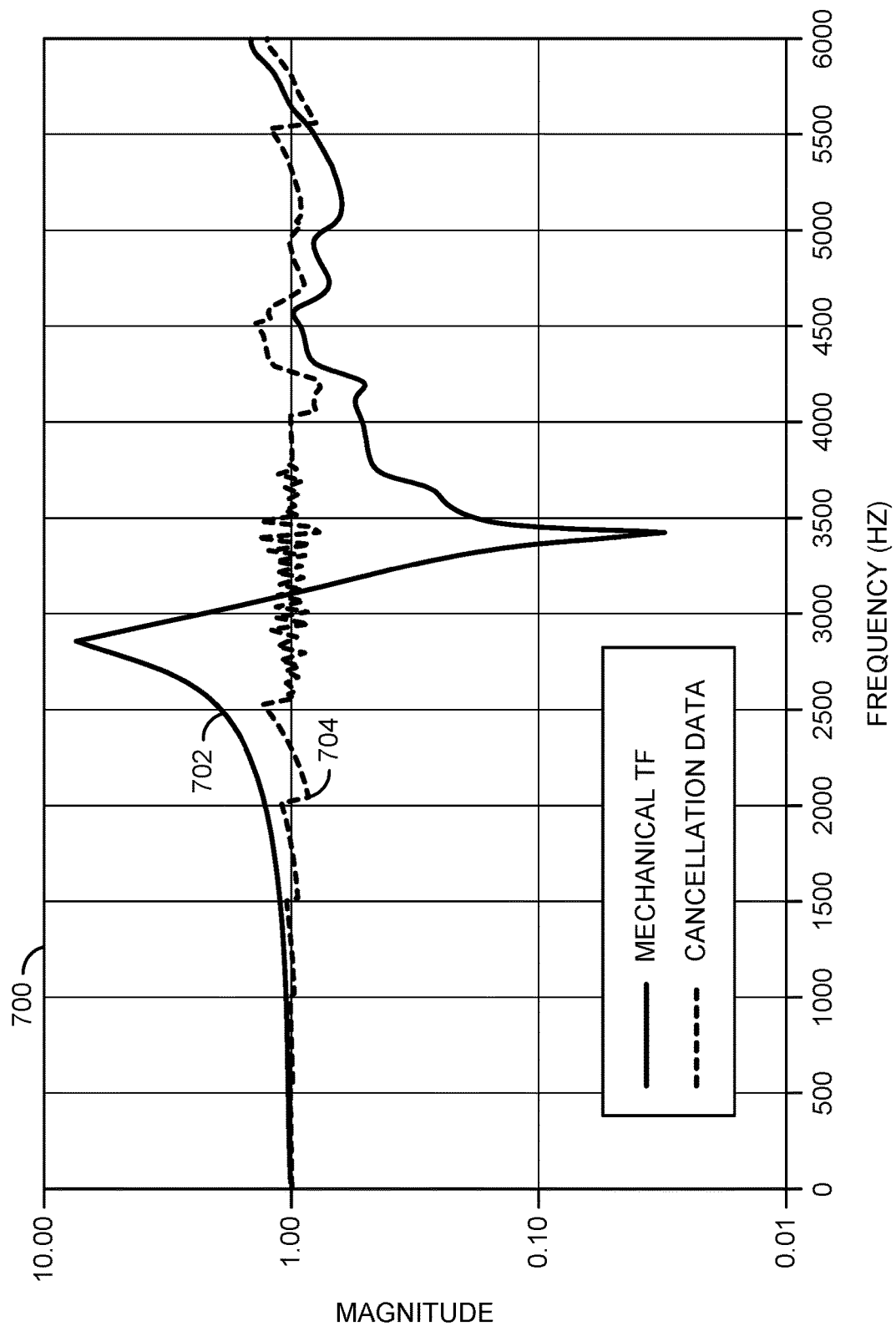
FIG. 9 is a diagram illustrating an example of variable frequency band cancellation in accordance with an example embodiment of the invention.

Referring to FIG. 9, a diagram of a graph 700 is shown illustrating an example of a variable frequency band cancellation technique in accordance with an example embodiment of the invention. A curve 702 illustrates an example mechanical transfer function of a housing. In an example, a lookup table implementing variable spaced blocks may provide greater improvement in the signal than would have been realized with no filtering and with constant frequency bands. A curve 704 illustrates an example filtered signal resulting from variable frequency band cancellation values in accordance with an example embodiment of the invention.

Figure 10:
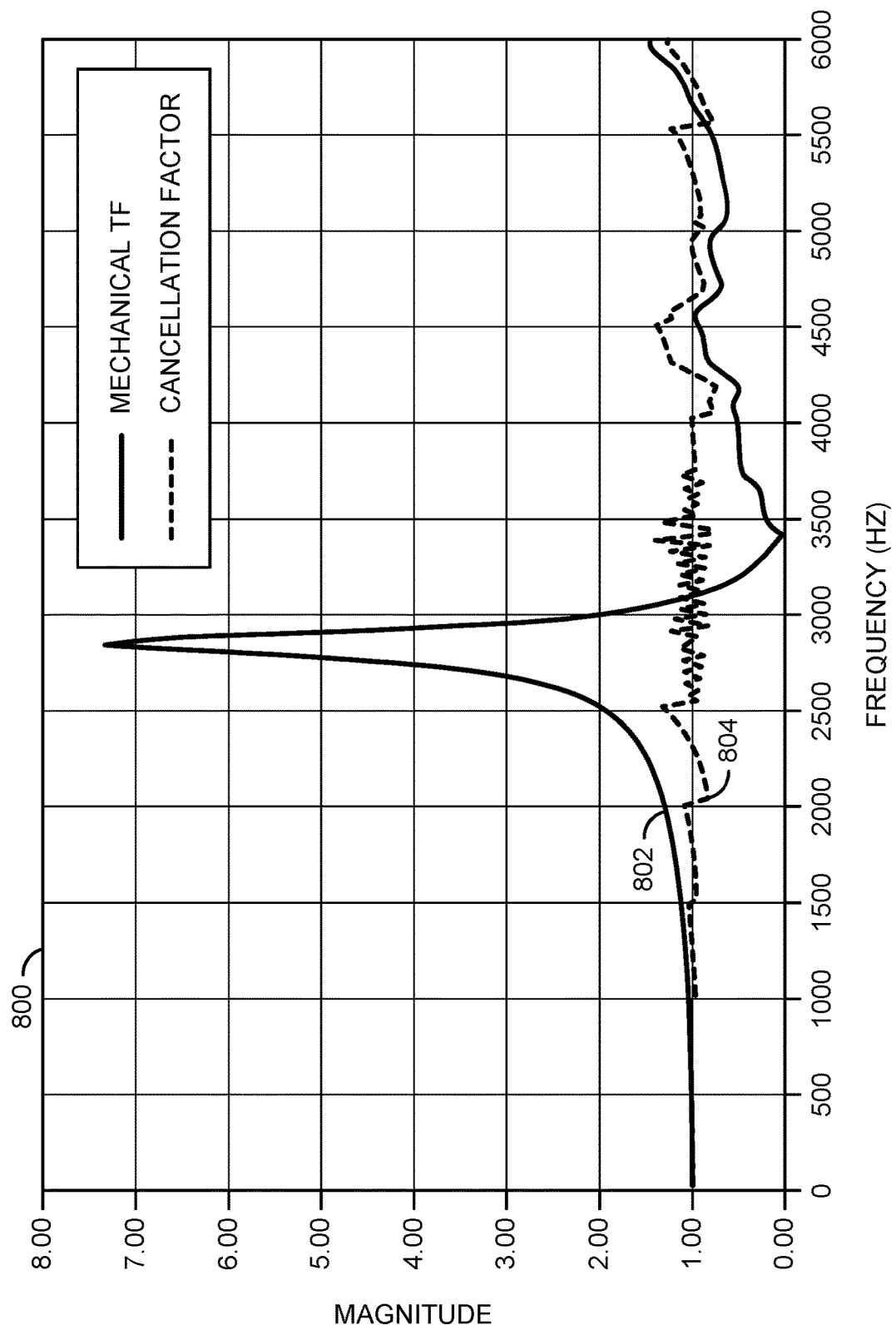
FIG. 10 is a diagram illustrating an example of cancellation in accordance with an example embodiment of the invention.

Referring to FIG. 10 is a diagram of a graph 800 is shown illustrating another example of cancellation in accordance with an example embodiment of the invention. A curve 802 illustrates another example mechanical transfer function of a housing. In an example, a cancellation table with variably spaced blocks may provide greater improvement in the signal than would have been realized with no filtering and with constant frequency bands. A curve 804 illustrates an example filtered signal resulting from variable frequency band cancellation values in accordance with an example embodiment of the invention.

Figure 11:
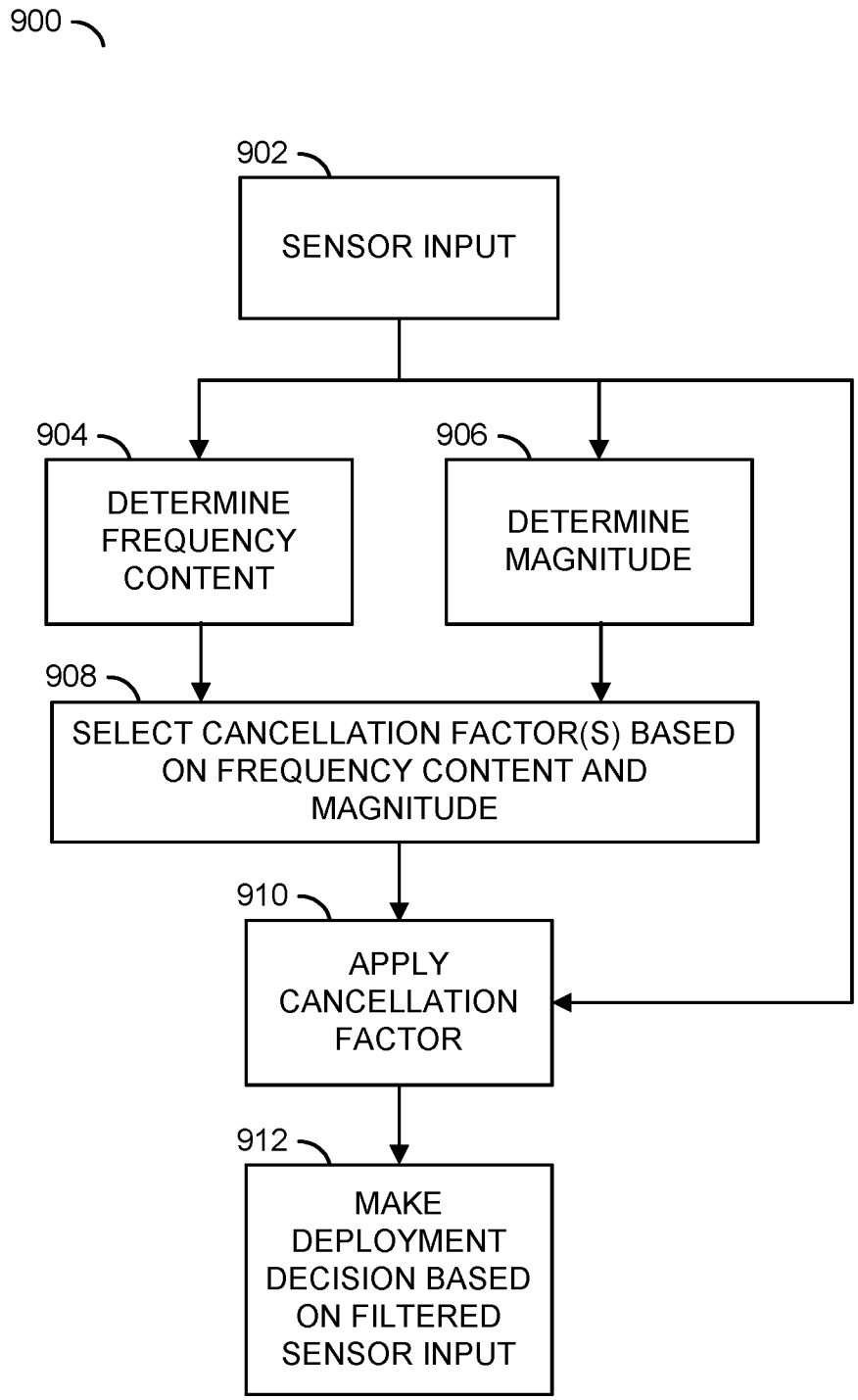
FIG. 11 is a flow diagram illustrating a method in accordance with an example embodiment of the invention.

Referring to FIG. 11 is a flow diagram illustrating a method in accordance with an example embodiment of the invention. In an example, the filter 104 in the ECU 100 may implement a process 900. The process (or method) 900 may be configured to utilize a variable frequency band digital representation of a mechanical transfer function of a sensor housing to negate the effect of the mechanical transfer function of the housing on the a signal generated by the sensor. In an example, the process 900 may comprise a step (or state) 902, a step (or state) 904, a step (or state) 906, a step (or state) 908, a step (or state) 910, and a step (or state) 912. In the step, 902, the filter 104 in the ECU 100 may receive a sensor input. In the step 904, the process 900 may determine a frequency content of the sensor input. In the step 906, the process 900 may determine a magnitude of the sensor input. The steps 904 and 906 may be performed serially or in parallel.

In the step 908, the process 900 selects a cancellation factor or factors based on the frequency content and magnitude determined in the steps 904 and 906. In an example, the cancellation factors may be selected from a lookup table like the one illustrated in FIG. 5. In the step 910, the process 900 filters the sensor input signal by applying the cancellation factor or factors to the sensor input signal received in the step 902. In the step 912, the process 900 utilizes the filtered sensor input signal to make a deployment decision (e.g., triggering an airbag, triggering a seatbelt pretensioner, etc.).

Figure 12:
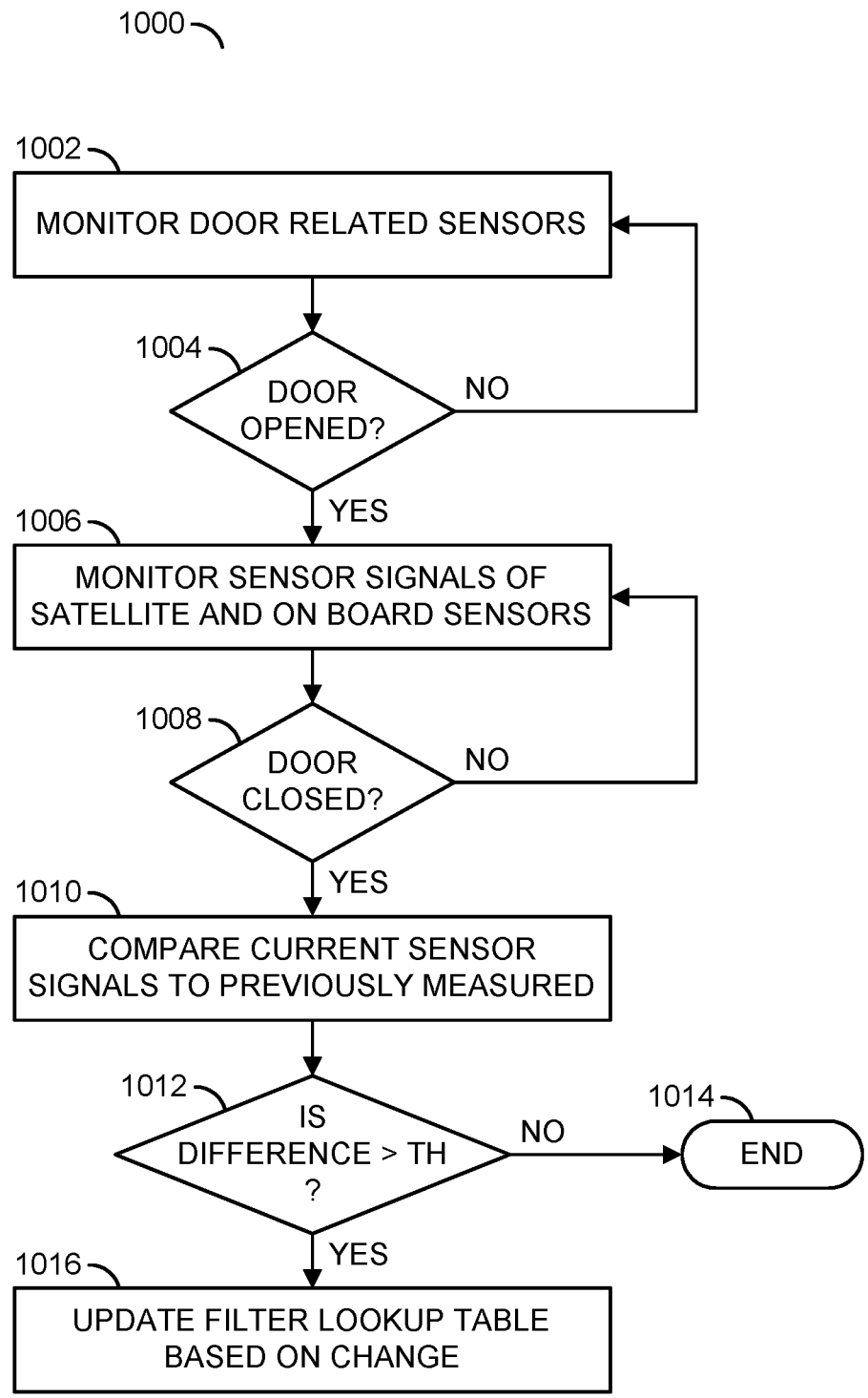
FIG. 12 is a flow diagram illustrating a method in accordance with another example embodiment of the invention.

Referring to FIG. 12 is a flow diagram of a process 1000 is shown illustrating a method in accordance with another example embodiment of the invention. In an example, the process (or method) 1000 may be configured to update values in the lookup table 120 of the ECU filter 104 over a lifetime of the vehicle. The lookup table values are configured to negate effects of the mechanical transfer functions associated with the housings of the sensor elements. As the vehicle and the sensor assemblies age, the mechanical transfer function may change. Changes to the mechanical transfer function(s) may reduce the effectiveness of the values in the lookup table 120 for negating the effects of the mechanical transfer functions of the housings. To compensate for such change, the process 1000 may be implemented to periodically update the lookup table values by estimating changes in the mechanical transfer functions and modifying the lookup table 120 appropriately.

In an example, the process (or method) 1000 may comprise a step (or state) 1002, a step (or state) 1004, a step (or state) 1006, a step (or state) 1008, a step (or state) 1010, a step (or state) 1012, a step (or state) 1014, and a step (or state) 1016. In the step 1002, the vehicle 90 may monitor door related sensors to determine whether a door has been opened. In the step 1004, the process 1000 checks if a door is open (e.g., pin switch activated, dome light turned on, etc.). If a door is not open, the process 1000 continues monitoring the door related sensors. When a door of the vehicle 90 is detected as being opened, the process 1000 may move to the step 1006 to begin monitoring additional sensors (e.g., satellite and onboard sensors of the ECU 100). In the step 1008, the process 1000 checks if a door is closed (e.g., pin switch de-activated, dome light turned off, etc.). If the door is not closed, the process 1000 continues monitoring the sensors. When the door is closed, the process 1000 may move to the step 1010.

In the step 1010, the process 1000 compares the sensor signals received in response to the door being closed with a previous measurement or measurements to determine whether the mechanical transfer function of the sensors has changed. In the step 1012, if there is no change or any change is less than a predetermined threshold, the process 1000 moves to the step 1014 and ends. If there is a change that is greater than the predetermined threshold, the process 1000 may move to the step 1016 to update the values in the lookup table 120 appropriately. The process 1000 may be repeated over a lifetime of the vehicle 90. The process 1000 generally provides real time feedback to maintain an accuracy of the representation of the mechanical transfer functions of the sensor housings.

The structures illustrated in the diagrams of FIGS. 1 to 12 may be designed, modeled, emulated, and/or simulated using one or more of a conventional general purpose processor, digital computer, microprocessor, microcontroller, distributed computer resources and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally embodied in a medium or several media, for example non-transitory storage media, and may be executed by one or more of the processors sequentially or in parallel.

Data signals generated by the sensor units may be transferred to one or more electronic control units. The electronic control units may utilize the sensor data in one or more transport vehicle functions including, but not limited to, engine control, transmission control, braking control, battery management, steering control, door control, human machine interface, seat control, speed control, restraint systems control, vehicle-to-vehicle communications and diagnostics. The electronic control units may include capabilities to adjust the sensor data to account for calibration issues, environmental factors and aging components.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
one or more sensors configured to generate sensor signals in response to mechanical signals received from a vehicle; and
a control unit comprising (i) an interface configured to receive the sensor signals from the sensors and (ii) a filter configured to reduce an effect that a mechanical transfer function of a housing of at least one of the sensors has on at least one of the sensor signals, wherein the filter is configured to utilize a variable frequency band digital representation of the mechanical transfer function to negate the effect of the mechanical transfer function of the housing on the at least one of the sensor signals, and the control unit is configured to update the variable frequency band digital representation of the mechanical transfer function over a lifetime of the vehicle.

2. The apparatus according to claim 1, wherein said sensors comprise at least one of a single-axis sensor, a dual-axis sensor, or a tri-axial sensor.

3. The apparatus according to claim 1, wherein said variable frequency band digital representation of said mechanical transfer function is stored in memory.

4. The apparatus according to claim 1, wherein said variable frequency band digital representation of said mechanical transfer function is embodied in one or more lookup tables.

5. The apparatus according to claim 1, wherein said variable frequency band digital representation of said mechanical transfer function comprises a plurality of multiplication factors corresponding to a plurality of frequency bands and a plurality of signal magnitudes.

6. The apparatus according to claim 1, wherein said filter is configured to amplify or attenuate a particular frequency band based upon a corresponding signal magnitude.

7. The apparatus according to claim 1, wherein said one or more sensors are part of a passive restraint system of the vehicle.

8. The apparatus according to claim 7, wherein said control unit is further configured to make a deployment decision for one or more safety devices based upon an output of said filter.

9. The apparatus according to claim 8, further comprising one or more airbags and one or more seatbelt pretensioners, wherein said control unit is further configured to control at least one of air bag deployment and seat belt pretensioning in response to inertial sensor data, impact sensor data, proximity sensor data or a combination thereof received from the one or more sensors.

10. The apparatus according to claim 1, wherein the variable frequency band digital representation of the mechanical transfer function is updated periodically in response to a door of the vehicle being opened and closed.

11. A method of mechanical transfer function cancellation comprising:
  receiving sensor signals from one or more sensors configured to generate the sensor signals in response to mechanical signals received from a vehicle;
  filtering the sensor signals to reduce an effect that a mechanical transfer function of a housing of at least one of the sensors has on at least one of the sensor signals, wherein the filtering utilizes a variable frequency band digital representation of the mechanical transfer function of the housing of the at least one of the sensors to negate the effect of the mechanical transfer function of the housing on the at least one of the sensor signals and the variable frequency band digital representation of the mechanical transfer function of the housing of the at least one of the sensors is updated over a lifetime of the vehicle; and
  making a deployment decision for one or more safety systems of the vehicle based on the filtered sensor signals.

12. The method according to claim 11, wherein said sensors comprise at least one of a single-axis sensor, a dual-axis sensor, or a tri-axial sensor.

13. The method according to claim 11, wherein said variable frequency band digital representation of said mechanical transfer function is stored in a memory of an electronic control unit of the vehicle.

14. The method according to claim 11, wherein said variable frequency band digital representation of said mechanical transfer function is embodied in one or more lookup tables.

15. The method according to claim 11, wherein said variable frequency band digital representation of said mechanical transfer function comprises a plurality of multiplication factors corresponding to a plurality of frequency bands and a plurality of signal magnitudes.

16. The method according to claim 11, wherein said filtering comprises amplifying or attenuating a particular frequency band based upon a corresponding signal magnitude.

17. The method according to claim 11, wherein said one or more sensors are part of a passive restraint system of the vehicle.

18. The method according to claim 17, wherein said deployment decision is related to one or more safety devices.

19. The method according to claim 18, wherein said deployment decision controls at least one of air bag deployment and seat belt pretensioning in response to inertial sensor data, impact sensor data, proximity sensor data or a combination thereof received from the one or more sensors.

20. The method according to claim 11, further comprising updating the variable frequency band digital representation of the mechanical transfer function periodically in response to a door of the vehicle being opened and closed.

* * * * *